US012757227B2

(12) United States Patent
Zhang et al.

(10) Patent No.: US 12,757,227 B2
(45) Date of Patent: Oct. 6, 2026

(54) INFORMATION PROCESSING METHOD AND APPARATUS, TERMINAL DEVICE, AND NETWORK DEVICE

(71) Applicant: DATANG MOBILE COMMUNICATIONS EQUIPMENT CO., LTD., Beijing (CN)

(72) Inventors: Huiying Zhang, Beijing (CN); Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 287 days.

(21) Appl. No.: 18/691,434

(22) PCT Filed: Sep. 14, 2022

(86) PCT No.: PCT/CN2022/118677
§ 371 (c)(1),
(2) Date: Mar. 12, 2024

(87) PCT Pub. No.: WO2023/040881
PCT Pub. Date: Mar. 23, 2023

(65) Prior Publication Data

US 2024/0389116 A1 Nov. 21, 2024

(30) Foreign Application Priority Data

Sep. 14, 2021 (CN) ........................ 202111072893.7

(51) Int. Cl.
*H04W 72/25* (2023.01)
*H04W 28/02* (2009.01)

(52) U.S. Cl.
CPC ....... *H04W 72/25* (2023.01); *H04W 28/0278* (2013.01)

(58) Field of Classification Search
CPC . H04W 72/25; H04W 28/0278; H04W 72/23; H04W 72/40; H04W 72/21; H04W 76/14; H04W 92/18; H04W 4/40
See application file for complete search history.

(56) References Cited

U.S. PATENT DOCUMENTS

2017/0353819 A1* 12/2017 Yin ....................... H04W 72/21
2018/0115873 A1* 4/2018 Aminaka ............. H04W 8/005
(Continued)

FOREIGN PATENT DOCUMENTS

CN 106793154 A 5/2017
CN 107040864 A 8/2017
(Continued)

OTHER PUBLICATIONS

International Search Report in International application No. PCT/CN2022/118677, issued on Nov. 28, 2022 with English translation provided by WIPO.
(Continued)

*Primary Examiner* — Wutchung Chu
(74) *Attorney, Agent, or Firm* — Ladas & Parry, LLP

(57) ABSTRACT

An information processing method, an information processing apparatus, a terminal device and a network device are provided. The information processing method includes sending indication information to a network device, wherein the indication information is used to indicate relationship between a sidelink destination identity and a sidelink SL transmission type, or relationship between service type information and an SL transmission type, and the SL transmission type is SL discovery or SL communication.

16 Claims, 5 Drawing Sheets

(56) References Cited

U.S. PATENT DOCUMENTS

| | | | | |
|---|---|---|---|---|
| 2020/0146082 | A1* | 5/2020 | Chen | H04W 4/40 |
| 2020/0228283 | A1 | 7/2020 | Cai et al. | |
| 2020/0229198 | A1* | 7/2020 | Kung | H04W 72/23 |
| 2021/0168814 | A1* | 6/2021 | Chen | H04L 5/0007 |
| 2022/0095366 | A1* | 3/2022 | Lee | H04W 28/0278 |
| 2022/0104209 | A1* | 3/2022 | Lee | H04W 72/542 |
| 2022/0201731 | A1* | 6/2022 | Lee | H04W 72/20 |
| 2022/0346180 | A1* | 10/2022 | Tseng | H04W 76/14 |
| 2022/0377720 | A1* | 11/2022 | Park | H04W 52/383 |
| 2023/0059876 | A1* | 2/2023 | Pan | H04L 1/1819 |
| 2023/0262835 | A1* | 8/2023 | Li | H04W 76/28 |
| 2024/0214991 | A1* | 6/2024 | Zheng | H04L 5/0048 |
| 2024/0276243 | A1* | 8/2024 | Chen | H04W 76/14 |
| 2024/0381381 | A1* | 11/2024 | Park | H04W 52/0235 |

FOREIGN PATENT DOCUMENTS

| | | | | | |
|---|---|---|---|---|---|
| CN | 113382388 | A | | 9/2021 | |
| EP | 4456575 | A1 | | 10/2024 | |
| KR | 20210057799 | A | * | 5/2021 | H04W 72/20 |
| KR | 20240004690 | A | * | 1/2024 | H04W 72/25 |
| WO | 2016147235 | A1 | | 12/2017 | |
| WO | 2019028699 | A1 | | 2/2019 | |
| WO | WO-2020164009 | A1 | * | 8/2020 | H04W 72/20 |

OTHER PUBLICATIONS

Oppo, "Discussion on NR Sidelink Cast Type Indication," 3GPP TSG-RAN WG1 Meeting #101-e, R1-2004067, May 15, 2020.

Zte et al., "Overall Consideration on NR V2X Resource Allocation," 3GPP TSG-RAN WG2#104, R2-1816981, Nov. 2, 2018.

Written Opinion in International application No. PCT/CN2022/118677, issued on Nov. 28, 2022 with English translation provided by WIPO.

Office action and search report in Chinese patent Application No. 202111072893.7, issued on Apr. 26, 2025.

"Discussion on SL information reporting over Uu," 3GPP TSG-RAN WG2 #107bis, R2-1913324, Ericsson, Oct. 14-18, 2019 (Oct. 4, 2019).

"Further details of Uu RRC procedures for sidelink," 3GPP TSG-RAN WG2 Meeting#107bis, R2-1913708, Huawei, HiSilicon, Oct. 14-18, 2019 (Oct. 4, 2019).

Supplementary European Search Report in the corresponding EP patent Application No. 22869250.5, issued on Dec. 19, 2024.

Office action and search report in Chinese patent Application No. 202111072893.7, issued on Sep. 6, 2025.

"[AT115-e][617][Relay] Continuation of discussion on discovery (CATT)," 3GPP TSG RAN WG2 Meeting #115-e, R2-2108949, CATT, Aug. 16-27, 2021.

* cited by examiner

INFORMATION PROCESSING METHOD AND APPARATUS, TERMINAL DEVICE, AND NETWORK DEVICE

CROSS-REFERENCE TO RELATED APPLICATIONS

This application is a U.S. national phase application of a PCT Application No. PCT/CN2022/118677 filed on Sep. 14, 2022, which claims a priority to Chinese Patent Application No. 202111072893.7 filed on Sep. 14, 2021, the disclosures of which are incorporated in their entireties by reference herein.

TECHNICAL FIELD

This application relates to the field of communications technologies, and in particular, to an information processing method, an information processing apparatus, a terminal device, and a network device.

BACKGROUND

Currently, there are two different communication mechanisms in a sidelink communication PC5 interface, that is, sidelink (SL) discovery and SL communication. SL discovery is used for mutual search and discovery between terminals, and SL communication is used for inter-terminal interaction control or data information. Generally, a terminal first performs a SL discovery process, finds a target terminal of the SL communication, and then performs a SL communication process.

However, since the SL discovery may use a resource pool shared with the SL communication, and/or a resource pool dedicated to the SL discovery, a base station needs to know whether to schedule a SL discovery resource or a SL communication resource in a case that the base station schedules a resource allocation mode; and the base station in a mechanism in the related art cannot learn the information.

It can be learned from the foregoing that, in the related art, there is a problem that a network device cannot determine a resource type required for scheduling a terminal device.

SUMMARY

An objective of the present application is to provide an information processing method and apparatus, a terminal device, and a network device, to resolve a problem in the related art that a network device cannot determine a resource type that needs to be scheduled for a terminal device.

To resolve the foregoing technical problem, an embodiment of the present application provides an information processing method applied to a terminal device, the method includes: sending indication information to a network device, wherein the indication information is used to indicate relationship between a sidelink destination identity and a sidelink SL transmission type, or relationship between service type information and an SL transmission type, and the SL transmission type is SL discovery or SL communication.

Optionally, one sidelink destination identity in the relationship corresponds to one SL transmission type; and/or one service type information in the relationship corresponds to one SL transmission type.

Optionally, the indication information includes first identification information of the SL transmission type; in a case that the first identification information takes a first value, the first identification information indicates that the SL transmission type is the SL discovery; in a case that the first identification information takes a second value, the first identification information indicates that the SL transmission type is the SL communication; or, the indication information includes second identification information of the SL transmission type; in a case that the second identification information appears, the indication information indicates that the SL transmission type is the SL discovery; in a case that the second identification information does not appear, the indication information indicates that the SL transmission type is the SL communication; or, the indication information includes third identification information of the SL transmission type; in a case that the third identification information appears, the indication information indicates that the SL transmission type is the SL communication; in a case that the third identification information does not appear, the indication information indicates that the SL transmission type is the SL discovery.

Optionally, if the indication information includes the second identification information of the SL transmission type, then in a case that the second identification information appears, the second identification information includes a sidelink destination identity, and the sidelink destination identity corresponds to a sidelink destination index.

Optionally, in a case that the terminal device reports a sidelink buffer status report (SL-BSR), if the sidelink destination identity corresponding to the sidelink destination index carried in the SL-BSR is the sidelink destination identity included in the second identification information, a resource requested by the SL-BSR is an SL discovery resource.

Optionally, sending the indication information to the network device includes: sending the indication information to the network device by using the first radio resource control RRC information, wherein the first RRC information is sidelink user equipment information SUI, or user equipment assistance information UAI, or other RRC information other than the SUI and the UAI.

Optionally, in a case that the first RRC information is the SUI, the indication information is included in a sidelink communication resource request corresponding to the sidelink destination identity, the indication information includes a sidelink destination index corresponding to the sidelink destination identity and identification information of the SL transmission type corresponding to the sidelink destination index, wherein the identification information is the first identification information, or the second identification information or the third identification information.

Optionally, after sending the indication information to the network device, the method further includes: sending an SL buffer status report to the network device, wherein the SL buffer status report carries a sidelink destination index corresponding to the sidelink destination identity.

Optionally, in a case that the first RRC information is the UAI, the UAI is further used to request a transmission resource.

An information processing method applied to a network device is provided in some embodiments of the present application, the method includes: receiving indication information sent by a terminal device; determining a target transmission resource type according to the indication information; wherein the indication information is used to indicate relationship between a sidelink destination identity and a sidelink SL transmission type, or relationship between service type information and an SL transmission type; the SL transmission type is SL discovery or SL communication; and the target transmission resource type is an SL transmission resource type corresponding to the sidelink destination identity, or an SL transmission resource type corresponding to the service type information.

Optionally, one sidelink destination identities in the relationship corresponds to one SL transmission type; and/or one service type information in the relationship corresponds to one SL transmission type.

Optionally, the indication information includes first identification information of the SL transmission type; in a case that the first identification information takes a first value, the indication information indicates that the SL transmission type is the SL discovery; in a case that the first identification information takes a second value, the indication information indicates that the SL transmission type is the SL communication; or, the indication information includes second identification information of the SL transmission type; in a case that the second identification information appears, the indication information indicates that the SL transmission type is the SL discovery; in a case that the second identification information does not appear, the indication information indicates that the SL transmission type is the SL communication; or, the indication information includes third identification information of an SL transmission type; in a case that the third identification information appears, the indication information indicates that the SL transmission type is the SL communication; in a case that the third identification information does not appear, the indication information indicates that the SL transmission type is the SL discovery.

Optionally, if the indication information includes the second identification information of the SL transmission type, then in a case that the second identification information appears, the second identification information includes a sidelink destination identity, and the sidelink destination identity corresponds to a sidelink destination index.

Optionally, in a case that a sidelink buffer status report (SL-BSR) reported by the terminal device is received, if the sidelink destination identity corresponding to the sidelink destination index carried in the SL-BSR is the sidelink destination identity included in the second identification information, a resource requested by the SL-BSR is determined to be an SL discovery resource.

Optionally, receiving the indication information sent by the terminal device includes: receiving the indication information sent by the terminal device by using first radio resource control RRC information, wherein the first RRC information is sidelink user equipment information SUI, or user equipment assistance information UAI, or other RRC information other than the SUI and the UAI.

Optionally, in a case that the first RRC information is the SUI, the indication information is included in a sidelink communication resource request corresponding to a sidelink destination identity, and the indication information includes a sidelink destination index corresponding to a sidelink destination identity and identification information of an SL transmission type corresponding to the sidelink destination index, wherein the identification information is the first identification information or the second identification information or the third identification information.

Optionally, the method further includes: receiving an SL buffer status report sent by the terminal device; wherein determining the target transmission resource type according to the indication information includes: determining a target transmission resource type according to the indication information and the SL buffer status report, wherein the SL buffer status report carries a sidelink destination index corresponding to the sidelink destination identity.

Optionally, in a case that the first RRC information is the UAI, the UAI is further used to request a transmission resource.

A terminal device is provided in some embodiments of the present application, the terminal device includes: a memory, a transceiver, and a processor, wherein the memory is used to store a computer program; the transceiver is used to send and receive data under control of the processor; and the processor is used to read the computer program in the memory and perform following operations:

sending indication information to a network device by using the transceiver, wherein the indication information is used to indicate relationship between a sidelink destination identity and a sidelink SL transmission type, or relationship between service type information and an SL transmission type, and the SL transmission type is SL discovery or SL communication.

Optionally, one sidelink destination identity in the relationship corresponds to one SL transmission type; and/or one service type information in the relationship corresponds to one SL transmission type.

Optionally, the indication information includes first identification information of the SL transmission type; in a case that the first identification information takes a first value, the first identification information indicates that the SL transmission type is the SL discovery; in a case that the first identification information takes a second value, the first identification information indicates that the SL transmission type is the SL communication; or, the indication information includes second identification information of the SL transmission type; in a case that the second identification information appears, the indication information indicates that the SL transmission type is the SL discovery; in a case that the second identification information does not appear, the indication information indicates that the SL transmission type is the SL communication; or, the indication information includes third identification information of the SL transmission type; in a case that the third identification information appears, the indication information indicates that the SL transmission type is the SL communication; in a case that the third identification information does not appear, the indication information indicates that the SL transmission type is the SL discovery.

Optionally, if the indication information includes the second identification information of the SL transmission type, then in a case that the second identification information appears, the second identification information includes a sidelink destination identity, and the sidelink destination identity corresponds to a sidelink destination index.

Optionally, in a case that the terminal device reports a sidelink buffer status report (SL-BSR), if the sidelink destination identity corresponding to the sidelink destination index carried in the SL-BSR is the sidelink destination identity included in the second identification information, a resource requested by the SL-BSR is an SL discovery resource.

Optionally, sending the indication information to the network device includes: sending the indication information to the network device by using the first radio resource control RRC information, wherein the first RRC information is sidelink user equipment information SUI, or user equipment assistance information UAI, or other RRC information other than the SUI and the UAI.

Optionally, in a case that the first RRC information is the SUI, the indication information is included in a sidelink communication resource request corresponding to the sidelink destination identity, the indication information includes a sidelink destination index corresponding to the sidelink destination identity and identification information of the SL transmission type corresponding to the sidelink destination index, wherein the identification information is the first identification information, or the second identification information or the third identification information.

Optionally, the operation performed by the processor further includes: after sending the indication information to the network device, sending an SL buffer status report to the network device by using the transceiver, wherein the SL buffer status report carries a sidelink destination index corresponding to the sidelink destination identity.

Optionally, in a case that the first RRC information is the UAI, the UAI is further used to request a transmission resource.

A network device is provided in some embodiments of the present application. The network device includes: a memory, a transceiver, and a processor, wherein the memory is used to store a computer program; the transceiver is used to send and receive data under control of the processor; and the processor is used to read the computer program in the memory and perform the following operations:

receiving, by using the transceiver, indication information sent by a terminal device;

determining a target transmission resource type according to the indication information; wherein the indication information is used to indicate relationship between a sidelink destination identity and a sidelink SL transmission type, or relationship between service type information and an SL transmission type; the SL transmission type is SL discovery or SL communication; and the target transmission resource type is an SL transmission resource type corresponding to the sidelink destination identity, or an SL transmission resource type corresponding to the service type information.

Optionally, one sidelink destination identities in the relationship corresponds to one SL transmission type; and/or one service type information in the relationship corresponds to one SL transmission type.

Optionally, the indication information includes first identification information of the SL transmission type; in a case that the first identification information takes a first value, the indication information indicates that the SL transmission type is the SL discovery; in a case that the first identification information takes a second value, the indication information indicates that the SL transmission type is the SL communication; or, the indication information includes second identification information of the SL transmission type; in a case that the second identification information appears, the indication information indicates that the SL transmission type is the SL discovery; in a case that the second identification information does not appear, the indication information indicates that the SL transmission type is the SL communication; or, the indication information includes third identification information of an SL transmission type; in a case that the third identification information appears, the indication information indicates that the SL transmission type is the SL communication; in a case that the third identification information does not appear, the indication information indicates that the SL transmission type is the SL discovery.

Optionally, if the indication information includes the second identification information of the SL transmission type, then in a case that the second identification information appears, the second identification information includes a sidelink destination identity, and the sidelink destination identity corresponds to a sidelink destination index.

Optionally, in a case that a sidelink buffer status report SL-BSR reported by the terminal device is received, if the sidelink destination identity corresponding to the sidelink destination index carried in the SL-BSR is the sidelink destination identity included in the second identification information, a resource requested by the SL-BSR is determined to be an SL discovery resource.

Optionally, receiving the indication information sent by the terminal device includes: receiving the indication information sent by the terminal device by using first radio resource control RRC information, wherein the first RRC information is sidelink user equipment information SUI, or user equipment assistance information UAI, or other RRC information other than the SUI and the UAI.

Optionally, in a case that the first RRC information is the SUI, the indication information is included in a sidelink communication resource request corresponding to a sidelink destination identity, and the indication information includes a sidelink destination index corresponding to a sidelink destination identity and identification information of an SL transmission type corresponding to the sidelink destination index, wherein the identification information is the first identification information or the second identification information or the third identification information.

Optionally, the operation performed by the processor further includes: receiving, by using the transceiver, an SL buffer status report sent by the terminal device; wherein determining the target transmission resource type according to the indication information includes: determining a target transmission resource type according to the indication information and the SL buffer status report, wherein the SL buffer status report carries a sidelink destination index corresponding to the sidelink destination identity.

Optionally, in a case that the first RRC information is UAI, the UAI is further used to request a transmission resource.

An information processing apparatus applied to a terminal device is further provided in some embodiments of the present application. The apparatus includes: a first sending unit, used to send indication information to a network device, wherein the indication information is used to indicate relationship between a sidelink destination identity and a sidelink SL transmission type, or relationship between service type information and an SL transmission type, and the SL transmission type is SL discovery or SL communication.

Optionally, one sidelink destination identity in the relationship corresponds to one SL transmission type; and/or one service type information in the relationship corresponds to one SL transmission type.

Optionally, the indication information includes first identification information of the SL transmission type; in a case that the first identification information takes a first value, the first identification information indicates that the SL transmission type is the SL discovery; in a case that the first identification information takes a second value, the first identification information indicates that the SL transmission type is the SL communication; or, the indication information includes second identification information of the SL transmission type; in a case that the second identification information appears, the indication information indicates that the SL transmission type is the SL discovery; in a case that the second identification information does not appear, the indication information indicates that the SL transmission type is the SL communication; or, the indication information includes third identification information of the SL transmission type; in a case that the third identification information appears, the indication information indicates that the SL transmission type is the SL communication; in a case that the third identification information does not appear, the indication information indicates that the SL transmission type is the SL discovery.

Optionally, if the indication information includes the second identification information of the SL transmission type, then in a case that the second identification information appears, the second identification information includes a sidelink destination identity, and the sidelink destination identity corresponds to a sidelink destination index.

Optionally, in a case that the terminal device reports a sidelink buffer status report (SL-BSR), if the sidelink destination identity corresponding to the sidelink destination index carried in the SL-BSR is the sidelink destination identity included in the second identification information, a resource requested by the SL-BSR is an SL discovery resource.

Optionally, sending the indication information to the network device includes: sending the indication information to the network device by using the first radio resource control RRC information, wherein the first RRC information is sidelink user equipment information SUI, or user equipment assistance information UAI, or other RRC information other than the SUI and the UAI.

Optionally, in a case that the first RRC information is the SUI, the indication information is included in a sidelink communication resource request corresponding to the sidelink destination identity, the indication information includes a sidelink destination index corresponding to the sidelink destination identity and identification information of the SL transmission type corresponding to the sidelink destination index, wherein the identification information is the first identification information, or the second identification information or the third identification information.

Optionally, the terminal device further includes a second sending unit, used to, after sending the indication information to the network device, send an SL buffer status report to the network device, where the SL buffer status report carries a sidelink destination index corresponding to the sidelink destination identity.

Optionally, in a case that the first RRC information is the UAI, the UAI is further used to request a transmission resource.

An information processing apparatus applied to a network device is further provided in the embodiments of the present application. The apparatus includes:

a first receiving unit, used to receive indication information sent by a terminal device; and a first determining unit, used to determine a target transmission resource type according to the indication information; wherein the indication information is used to indicate relationship between a sidelink destination identity and a sidelink SL transmission type, or relationship between service type information and an SL transmission type; the SL transmission type is SL discovery or SL communication; and the target transmission resource type is an SL transmission resource type corresponding to the sidelink destination identity, or an SL transmission resource type corresponding to the service type information.

Optionally, one sidelink destination identities in the relationship corresponds to one SL transmission type; and/or one service type information in the relationship corresponds to one SL transmission type.

Optionally, the indication information includes first identification information of the SL transmission type; in a case that the first identification information takes a first value, the indication information indicates that the SL transmission type is the SL discovery; in a case that the first identification information takes a second value, the indication information indicates that the SL transmission type is the SL communication; or, the indication information includes second identification information of the SL transmission type; in a case that the second identification information appears, the indication information indicates that the SL transmission type is the SL discovery; in a case that the second identification information does not appear, the indication information indicates that the SL transmission type is the SL communication; or, the indication information includes third identification information of an SL transmission type; in a case that the third identification information appears, the indication information indicates that the SL transmission type is the SL communication; in a case that the third identification information does not appear, the indication information indicates that the SL transmission type is the SL discovery.

Optionally, if the indication information includes the second identification information of the SL transmission type, then in a case that the second identification information appears, the second identification information includes a sidelink destination identity, and the sidelink destination identity corresponds to a sidelink destination index.

Optionally, in a case that a sidelink buffer status report (SL-BSR) reported by the terminal device is received, if the sidelink destination identity corresponding to the sidelink destination index carried in the SL-BSR is the sidelink destination identity included in the second identification information, a resource requested by the SL-BSR is determined to be an SL discovery resource.

Optionally, receiving the indication information sent by the terminal device includes: receiving the indication information sent by the terminal device by using first radio resource control RRC information, wherein the first RRC information is sidelink user equipment information SUI, or user equipment assistance information UAI, or other RRC information other than the SUI and the UAI.

Optionally, in a case that the first RRC information is the SUI, the indication information is included in a sidelink communication resource request corresponding to a sidelink destination identity, and the indication information includes a sidelink destination index corresponding to a sidelink destination identity and identification information of an SL transmission type corresponding to the sidelink destination index, wherein the identification information is the first identification information or the second identification information or the third identification information.

Optionally, the network device further includes: a second receiving unit, used to receive an SL buffer status report sent by the terminal device; wherein determining the target transmission resource type according to the indication information includes: determining a target transmission resource type according to the indication information and the SL buffer status report, wherein the SL buffer status report carries a sidelink destination index corresponding to the sidelink destination identity.

Optionally, in a case that the first RRC information is the UAI, the UAI is further used to request a transmission resource.

A processor-readable storage medium is further provided in the embodiments of the present application, wherein the processor-readable storage medium stores a computer program, and the computer program is used to cause a processor to perform the information processing method of a terminal device side; or the computer program is used to cause the processor to perform the information processing method of ta network device side.

The above technical solutions of the present application have the following beneficial effects.

In the foregoing solutions, the information processing method sends the indication information to the network device; wherein the indication information is used to indicate relationship between the sidelink destination identity and the sidelink SL transmission type, or relationship between the service type information and the SL transmission type; the SL transmission type is SL discovery or SL communication; and the terminal device can indicate the relationship between the sidelink destination identity or the service type information and the SL transmission type to the network device, so that the network device can subsequently clearly determine whether the SL discovery resource or the SL communication resource needs to be scheduled for the terminal device, thereby well solving the problem in the related art that the network device cannot determine the resource type required to be scheduled for the terminal device.

DETAILED DESCRIPTION

The following clearly and completely describes the technical solutions in the embodiments of the present application with reference to the accompanying drawings in the embodiments of the present application. Obviously, the described embodiments are only some embodiments of the present application, rather than all of the embodiments of the present application. All other embodiments obtained by a person of ordinary skill in the art based on the embodiments of the present application without creative efforts shall fall within the protection scope of the present application.

In the embodiments of the present application, the term "and/or" describes the association relationship of the associated objects, indicating that there may be three relationships, for example, A and/or B may indicate that A exists alone, A and B exist simultaneously, and B exists alone. The character "/" generally indicates an "or" relationship between the associated objects.

In the embodiments of the present application, the term "a plurality of" means two or more, and the other quantifiers are similar thereto.

The technical solutions provided in the embodiments of the present application may be applied to various systems, especially 5G systems. For example, the applicable systems may be a Global System of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Long Term Evolution Advanced (LTE-A) system, a Universal Mobile Telecommunication System (UMTS), Worldwide Interoperability for Microwave Access (WiMAX) system, a 5G New Radio (NR) system, and the like. Each of the plurality of systems includes a terminal device and a network device. The system may further include a core network part, for example, an Evolved Packet System (EPS), a 5G system (5GS), and the like.

Figure 1:
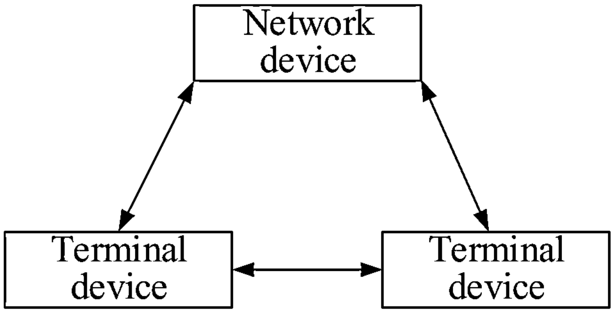
FIG. 1 is a schematic architectural diagram of a wireless communication system according to some embodiments of the present application.

FIG. 1 is a block diagram of a wireless communication system according to some embodiments of the present application. The wireless communication system includes a terminal device and a network device.

The terminal device in this embodiment of the present application may be a device that provides voice and/or data connectivity to a user, a handheld device having a wireless connection function, or another processing device connected to a wireless modem. In different systems, names of the terminal devices may be different, for example, in a 5G system, the terminal device may be referred to as user equipment (UE). The wireless terminal device may communicate with one or more core networks (Core Network, CN) through a Radio Access Network (RAN), and the wireless terminal device may be a mobile terminal device, such as a mobile phone (or referred to as a "cellular" phone) and a computer having a mobile terminal device, for example, may be a portable, pocket-sized, handheld, computer-built or vehicle-mounted mobile device, which exchanges language and/or data with a radio access network, for example, a device such as a personal communication service (PCS) phone, a cordless phone, a session initiation protocol (SIP) phone, a wireless local loop (WLL) station, and a personal digital assistant (PDA). The wireless terminal device may also be referred to as a system, a subscriber unit, a subscriber station, a mobile station, a mobile, a remote station, an access point, a remote terminal, an access terminal, a user terminal, a user agent, and a user device, which are not limited in the embodiments of the present application.

The network device in this embodiment of the present application may be a base station, and the base station may include a plurality of cells that provide services for the terminal. According to different specific application scenarios, a base station may also be referred to as an access point, or may be a device in an access network that communicates with a wireless terminal device through one or more sectors on an air interface, or another name. The network device may be used to replace the received air frame with an Internet Protocol (IP) packet as a router between the wireless terminal device and the rest of the access network, where the rest of the access network may include an Internet Protocol (IP) communication network. The network device may also coordinate attribute management of the air interface. For example, the network device in this embodiment of the present application may be a network device (Base Transceiver Station, BTS) in a Global System for Mobile Communications (GSM) or a Code Division Multiple Access (CDMA), or may be a network device (NodeB) in Wide-band Code Division Multiple Access (WCDMA), or or may be an evolutional Node B (Evolved Node B, eNB, or e-NodeB) in a Long Term Evolution (LTE) system, a 5G base station (gNB) in a 5G Network Architecture (Next Generation System), or may be a Home Evolved Node B (HeNB), a relay node, or a femto base station, a pico base Station, and the like, which are not limited in the embodiments of the present application. In some network structures, the network device may include a centralized unit (CU) node and a distributed unit (DU) node, and the centralized unit and the distributed unit may also be geographically separated.

One or more antennas may be used by each of the network device and the terminal device to perform multi-input multi-output (MIMO) transmission, and the MIMO transmission may be single user MIMO (SU-MIMO) or multiple user MIMO (MU-MIMO). According to the form and quantity of root antenna combination, the MIMO transmission may be two-dimensional MIMO (2D-MIMO), three-dimensional MIMO (3D-MIMO), full dimension MIMO (FD-MIMO), or massive-MIMO, or may be diversity transmission or precoding transmission or beamforming transmission.

The following describes content related to the solutions provided in the embodiments of the present application first.

(1) Cellular Network Communication.

Figure 2:
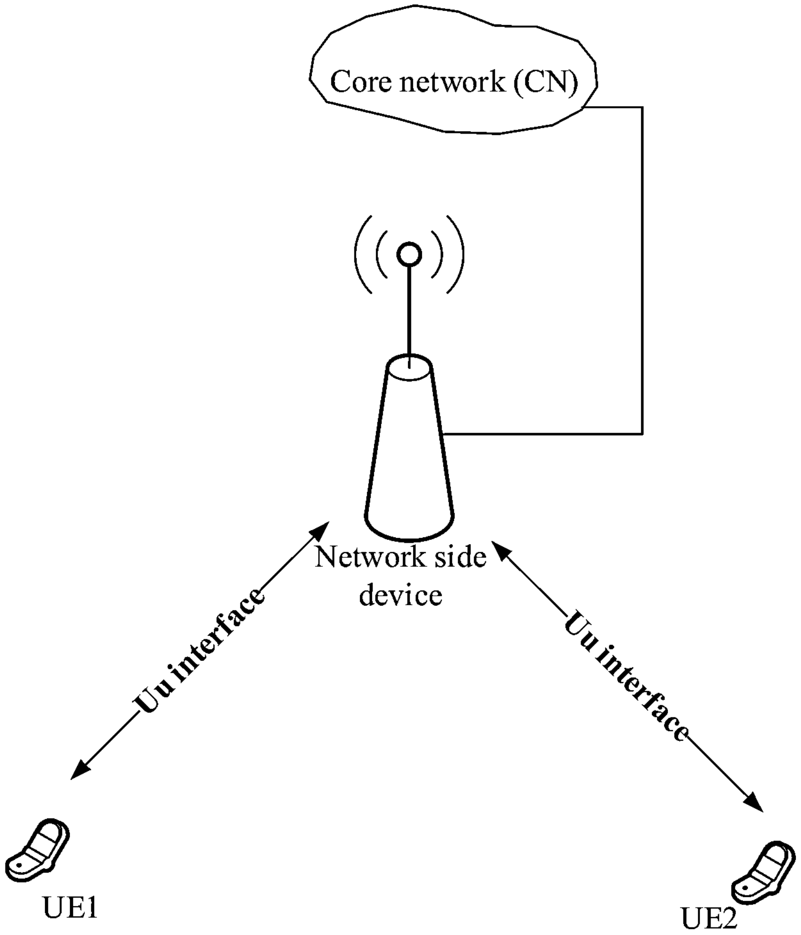
FIG. 2 is a schematic diagram of a communication mode of centralized network control in an LTE system according to some embodiments of the present application.

Traditional wireless communication adopts a cellular network communication mode, that is, a terminal UE and a network side device (that is, a network device) transmit uplink and downlink data or control information through a Uu interface (an LTE air interface); as shown in FIG. 2, the network side device is connected to the core network CN. The communication mode may also be understood as a communication mode of centralized network control in an LTE system.

Figure 3:
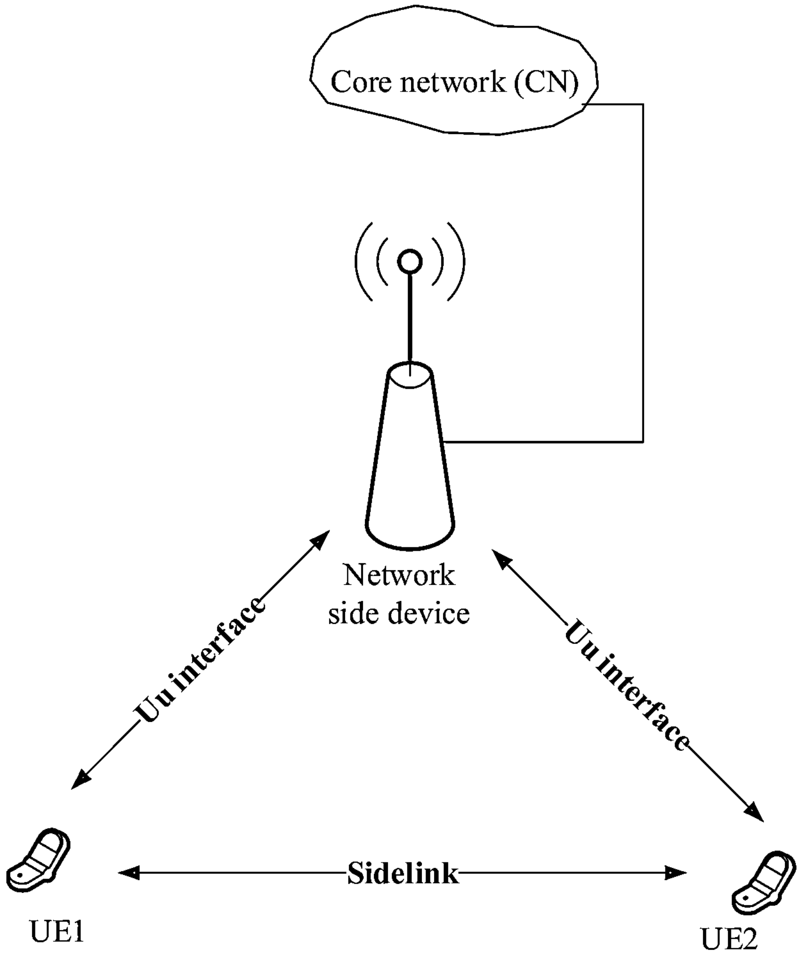
FIG. 3 is a schematic diagram of D2D discovery or communication according to some embodiments of the present application.

(2) Sidelink Communication;

Sidelink communication refers to a mode in which a neighboring terminal may perform data transmission through a sidelink communication link (also referred to as sidelink or PC5) within a short distance range. The wireless interface corresponding to the Sidelink link is referred to as a sidelink interface (also referred to as a Sidelink interface or a PC5 interface); as shown in FIG. 3, it may also be understood as discovery or communication of D2D (device-to-device).

Based on the foregoing, an embodiment of the present application provides an information processing method and apparatus, a terminal device, and a network device, to resolve a problem in the related art that a network device cannot accurately complete scheduling of a SL transmission resource scheduling. The method, the apparatus, the terminal device, and the network device are based on the same application concept, and because the principles of solving the problem by the method, the apparatus, the terminal device, and the network device are similar, the implementation of the method, the apparatus, the terminal device, and the network device may be similarly obtained by referring to each otter, and details are not described herein again.

Figure 4:
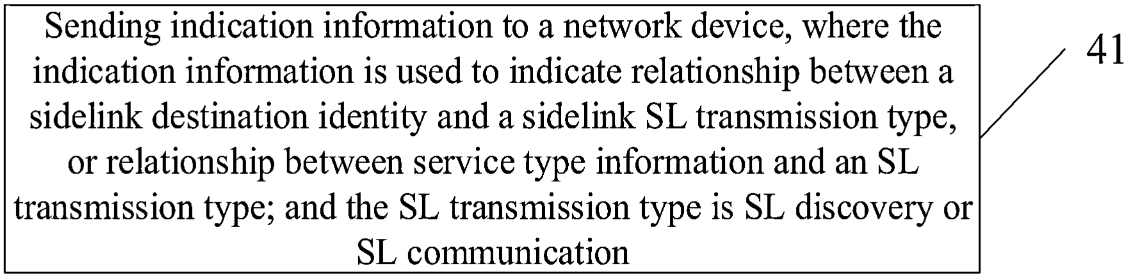
FIG. 4 is a first schematic flowchart of an information processing method according to some embodiments of the present application.

The information processing method provided in this embodiment of the present application is applied to a terminal device, and as shown in FIG. 4, the method includes:

Step 41: sending indication information to a network device, where the indication information is used to indicate relationship between a sidelink destination identity and a sidelink SL transmission type, or relationship between service type information and an SL transmission type; and the SL transmission type is SL discovery or SL communication.

The information processing method provided in this embodiment of the present application sends indication information to a network device; wherein the indication information is used to indicate relationship between the sidelink destination identity and the sidelink SL transmission type, or relationship between the service type information and the SL transmission type; the SL transmission type is SL discovery or SL communication; and the terminal device can indicate the relationship between the sidelink destination identity or the service type information and the SL transmission type to the network device, so that the network device can subsequently clearly determine whether the scheduling needed by the terminal device is the SL discovery resource or the SL communication resource, thereby well solving the problem in the related art that the network device cannot determine the scheduled resource type required by the terminal device.

The service type information may be referred to as sidelink communication service type information.

In this embodiment of the present application, one sidelink destination identity in the relationship corresponds to one SL transmission type; and/or one service type information in the relationship corresponds to one SL transmission type.

In this way, each SL transmission type may be accurately indicated.

If the indication information includes the first identification information of the SL transmission type; in a case that the first identification information takes a first value, the first identification information indicates that the SL transmission type is SL discovery; in a case that the first identification information takes a second value, the first identification information indicates that the SL transmission type is SL communication; or, if the indication information includes second identification information of the SL transmission type, then in a case that the second identification information appears, it indicates that the SL transmission type is SL discovery; in a case that the second identification information does not appear, it indicates that the SL transmission type is SL communication; or, if the indication information includes third identification information of an SL transmission type, then in a case that the third identification information appears, it indicates that the SL transmission type is SL communication; in a case that the third identification information does not appear, it indicates that the SL transmission type is SL discovery.

In this way, the SL transmission type can be flexibly indicated. In addition, for the case of the second identification information and the third identification information, the indication information includes identification information, which may be understood as: a field defining identification information in the indication information; "appear" may be understood as: there is filling content in a field of identification information included in the indication information; and "not appear" may be understood as: there is no filling content in a field of identification information included in the indication information.

Optionally, if the indication information includes the second identification information of the SL transmission type, then in a case that the second identification information appears, the second identification information includes a sidelink destination identity, and the sidelink destination identity corresponds to a sidelink destination index.

The second identification information may be carried in a SUI. The SUI may include a plurality of sidelink destination identities (for example, a destination ID), each sidelink destination identity corresponds to one sidelink destination index (for example, a destination index), and the sidelink destination index is a sequence number, in the list, of the sidelink destination identity in the SUI.

It should be noted that in a case that an information element (IE) of the SUI includes a first information element, the indication information indicates that the SL transmission type is SL discovery; in a case that the information element of the SUI includes a second information element, the indication information indicates that the SL transmission type is SL communication.

The first information element and the second information element may be different information elements of the SUI. The network device may determine, based on the second identification information included in the first information element reported by the terminal, that the SL transmission type is SL discovery or the SL transmission type is SL communication. The second identification information may be used to identify the first information element.

In an implementation, the first information element may be sl-TxResourceReqListDisc-r17, and information related to SL discovery may be reported by using the information element. The first information element may include second identification information. The second information element may be an information element other than the first information element.

In this way, it is determined that the SL transmission type is SL discovery or the SL transmission type is SL communication through the second identification information, so that the SL transmission type is indicated in a non-explicit indication manner, and resources occupied by indication information transmission can be reduced.

Optionally, in a case that the terminal device reports the SL-BSR, if the sidelink destination identity corresponding to the sidelink destination index carried in the SL-BSR is a sidelink destination identity included in the second identification information, then the resource requested by the SL-BSR is an SL discovery resource.

The resource that is requested by the terminal device and that is related to the SL discovery or the resource related to the SL communication may be determined by using the sidelink destination index carried in the SL BSR reported by the terminal device. If the sidelink destination identity corresponding to the sidelink destination index carried in the SL-BSR is a sidelink destination identity included in the second identification information, the resource requested by the SL-BSR is an SL discovery resource. If the sidelink destination identity corresponding to the sidelink destination index carried in the SL-BSR is not the sidelink destination identity included in the second identification information, then the resource requested by the SL-BSR is a resource related to SL communication.

In this way, the resource requested by the terminal device can be determined by using the sidelink destination identity index carried by the SL-BSR reported by the terminal device.

In this embodiment of the present application, sending the indication information to the network device includes: sending the indication information to the network device by using first radio resource control (RRC) information, where the first RRC information is sidelink terminal information (Sidelink UE Information NR, SUI), or UE assistance information (UAI), or other RRC information other than SUI and UAI.

In this way, the SL transmission type indication may be performed in multiple manners.

In a case that the first RRC information is SUI, the indication information is included in a sidelink communication resource request corresponding to a sidelink destination identity, and the indication information includes a sidelink destination index corresponding to a sidelink destination identity and identification information of an SL transmission type corresponding to the sidelink destination index, where the identification information is the first identification information or the second identification information or the third identification information.

In this way, indication of the SL transmission type can be performed under the condition that resources are saved to the maximum extent. Specifically, the sidelink destination identity—the sidelink destination index—the SL transmission type has sequential correspondence; and subsequently, the sidelink destination index may be directly transmitted, and the network device may learn the SL transmission type of the sidelink destination identity according to the sidelink destination index. The sidelink communication resource request is included in SUI.

In this embodiment of the present application, after sending the indication information to the network device, the method further includes: sending an SL buffer status report to the network device, where the SL buffer status report carries a sidelink destination index corresponding to the sidelink destination identity.

In this way, a resource scheduling request can be implemented.

In a case that the first RRC information is UAI, the UAI is further used to request a transmission resource.

In this way, the resource scheduling request can be implemented more quickly.

Figure 5:
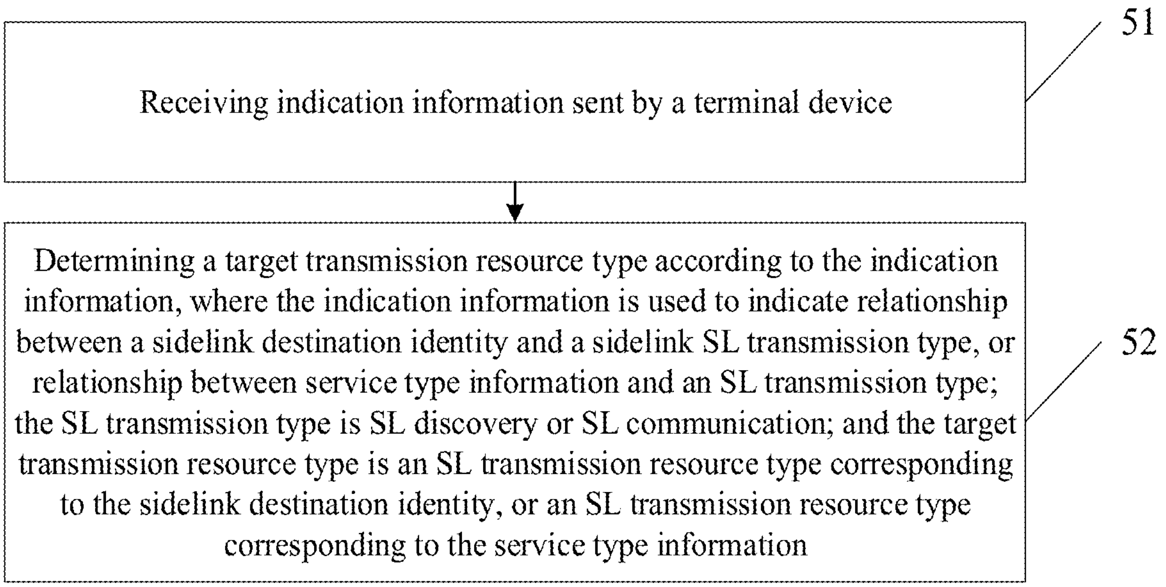
FIG. 5 is a second schematic flowchart of an information processing method according to some embodiments of the present application.

An embodiment of the present application further provides an information processing method, applied to a network device, as shown in FIG. 5. The method includes:

Step 51: receiving indication information sent by a terminal device;

Step 52: determining a target transmission resource type according to the indication information, where the indication information is used to indicate relationship between a sidelink destination identity and a sidelink SL transmission type, or relationship between service type information and an SL transmission type; the SL transmission type is SL discovery or SL communication; and the target transmission resource type is an SL transmission resource type corresponding to the sidelink destination identity, or an SL transmission resource type corresponding to the service type information.

The information processing method provided in this embodiment of the present application includes receiving the indication information sent by the terminal device, and determining a target transmission resource type according to the indication information; wherein the indication information is used to indicate relationship between the sidelink destination identity and the sidelink SL transmission type, or relationship between the service type information and the SL transmission type; the SL transmission type is SL discovery or SL communication; the target transmission resource type is an SL transmission resource type corresponding to the sidelink destination identity, or an SL transmission resource type corresponding to the service type information; and relationship between the sidelink destination identity or the service type information and the SL transmission type can be indicated by the terminal device to the network device. In this way, the network device may subsequently clearly determine whether scheduling needed by the terminal device is the SL discovery resource or the SL communication resource, thereby well solving the problem in the related art that the network device cannot determine the scheduled resource type required by the terminal device.

The service type information may be referred to as sidelink communication service type information.

In this embodiment of the present application, one sidelink destination identity in the relationship corresponds to one SL transmission type; and/or one service type information in the relationship corresponds to one SL transmission type.

In this way, each SL transmission type may be accurately indicated.

If the indication information includes the first identification information of the SL transmission type, then in a case that the first identification information takes a first value, it indicates that the SL transmission type is SL discovery; in a case that the first identification information takes a second value, it indicates that the SL transmission type is SL communication; or, if the indication information includes second identification information of the SL transmission type, then in a case that the second identification information appears, it indicates that the SL transmission type is SL discovery; in a case that the second identification information does not appear, it indicates that the SL transmission type is SL communication; or, if the indication information includes third identification information of an SL transmission type, it indicates that the SL transmission type is SL communication in a case that the third identification information appears; in a case that the third identification information does not appear, it indicates that the SL transmission type is SL discovery.

In this way, the SL transmission type can be flexibly indicated. In addition, for the case of the second identification information and the third identification information, the indication information includes identification information, which may be understood as: a field defining identification information in the indication information; "appear" may be understood as: there is filling content in a field of identification information included in the indication information; and "not appear" may be understood as: there is no filling content in a field of identification information included in the indication information.

In this embodiment of the present application, receiving the indication information sent by the terminal device includes: receiving indication information sent by the terminal device by using the first radio resource control RRC information, where the first RRC information is sidelink UE information SUI, or terminal assistance information UAI, or other RRC information other than SUI and UAI.

In this way, multiple types of indications of SL transmission type may be supported.

In a case that the first RRC information is SUI, the indication information is included in a sidelink communication resource request corresponding to a sidelink destination identity, and the indication information includes a sidelink destination index corresponding to a sidelink destination identity and identification information of an SL transmission type corresponding to the sidelink destination index, where the identification information is the first identification information or the second identification information or the third identification information.

In this way, indication of the SL transmission type can be performed under the condition that resources are saved to the maximum extent. Specifically, the sidelink destination identity—the sidelink destination index—the SL transmission type has sequential correspondence; and subsequently, the sidelink destination index may be directly transmitted, and the network device may learn the SL transmission type of the sidelink destination identity according to the sidelink destination index. The sidelink communication resource request is included in SUI.

The information processing method in this embodiment of the present application further includes: receiving an SL buffer status report sent by a terminal device, where the determining a target transmission resource type based on the indication information includes: determining a target transmission resource type according to the indication information and an SL buffer status report, where the SL buffer status report carries a sidelink destination index corresponding to a sidelink destination identity.

In this way, the resource scheduling request can be implemented.

In a case that the first RRC information is UAI, the UAI is further used to request a transmission resource.

In this way, the resource scheduling request can be implemented more quickly.

The following describes the information processing method provided in this embodiment of the present application, where the following terminal device is referred to as a terminal for short, and the network device is a base station which is taken as an example.

For the foregoing technical problem, an embodiment of the present application provides an information processing method, which may be specifically implemented as a method in which a terminal indicates relationship between a sidelink destination identity or service type information and an SL transmission type to a base station, so that the base station may explicitly perform resource allocation for SL discovery or communication.

This solution mainly relates to: a terminal sends indication information to a network to indicate relationship between a sidelink destination identity or service type information and an SL transmission type, where the SL transmission type may be one of the following: SL discovery and SL communication. The indication information may be sidelink UE information NR (SUI), UE assistance information (UAI), or other Uu interface signaling (corresponding to the foregoing other RRC information).

In addition, the specific manner of presenting the foregoing relationship may be: SL transmission type indication information for each (sidelink) communication destination identity, or SL transmission type indication information for each service type. One of the sidelink destination identities corresponding to the relationship corresponds to one SL transmission type; or one of the service type information in the relationship corresponds to one SL transmission type. Specifically, the SUI may include the relationship between a communication destination identity and an SL transmission type, the UAI may include the relationship between the service type information and the SL transmission type.

The indication information for one SL transmission type may be specifically implemented in any one of the following manners.

(1) 1-bit identification information is included, indicating an SL transmission type according to the value of the bit value (corresponding to a value of the first identification information), for example, the value of 0 indicates SL communication, and the value of 1 indicates SL discovery; certainly, the indication information may optionally be another number of bits, which is not limited herein.

(2) By 1-bit indication information (corresponding to the second identification information or the third identification information) appearing optionally, the SL transmission type is indicated according to whether the bit (that is, the indication information) appears, for example, SL communication is indicated when the bit does not appear, SL discovery is indicated when the bit appears; or SL communication is indicated when the bit appears, SL discovery is indicated when the bit does not appear. Certainly, the indication information may optionally be another number of bits, which is not limited herein.

The following specifically describes the solutions provided in the embodiments of the present application.

First example: it is assumed that the UE1 is a UE connected to a network, the serving base station of the UE is the base station 1, and the UE1 uses the Sidelink UE Information NR (i.e. SUI) message to indicate to the base station 1 the correspondence (corresponding to the above relationship) between the sidelink communication target identifier (i.e. the sidelink destination identity) and the sidelink communication transmission type (i.e. the SL transmission type). The transmission type corresponding to the sidelink communication target identifier (sl-Destination Identity) 1 is SL discovery, and the transmission type corresponding to the sl-Destination Identity 2 is SL communication.

Figure 6:
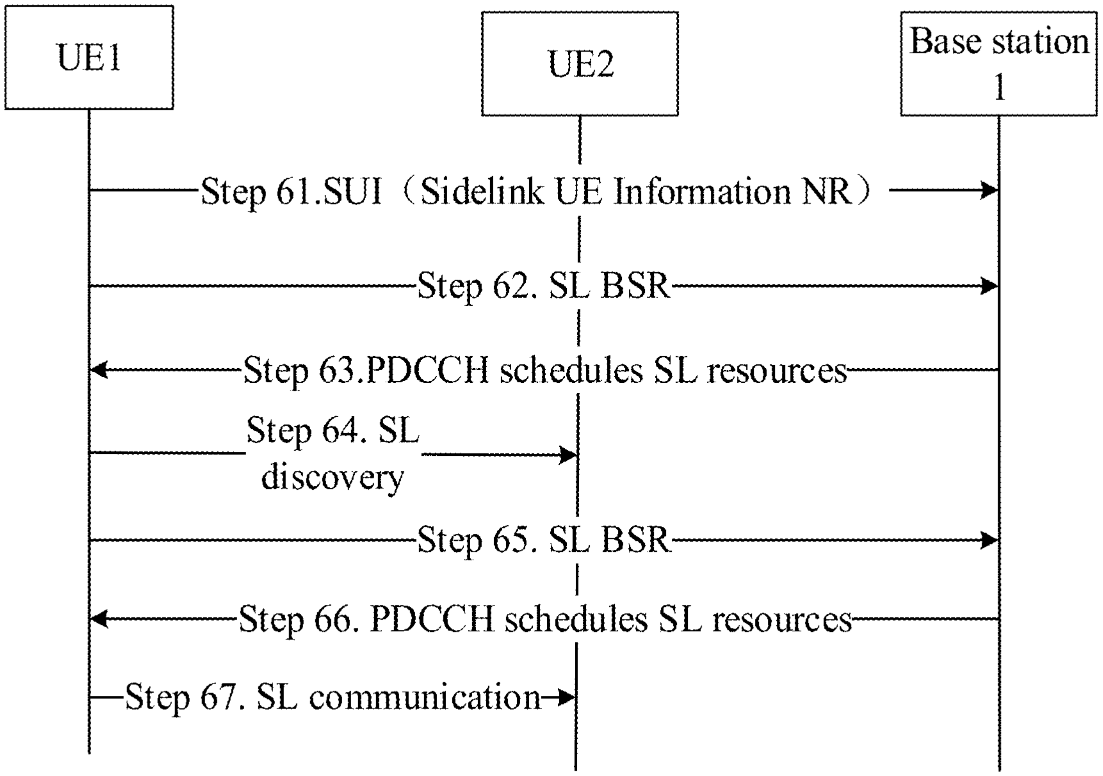
FIG. 6 is a first schematic flowchart of an information processing method according to some embodiments of the present application.

Specifically, as shown in FIG. 6, the UE indicates the SL transmission type through the Sidelink UE Information NR message, the following steps are involved.

Step 61: UE 1 sends a Sidelink UE Information NR message to the base station 1, where the Sidelink UE Information NR message includes correspondence between the sidelink destination identity and the SL transmission type, and the specific manner may be a sidelink communication resource request (SL-Tx Resource Req) corresponding to each sidelink destination identity, one of the following indication information is newly included:

(1) 1-bit transmission type information (i.e. 1-bit identification information), an SL transmission type is indicated according to the value of the bit (corresponding to the value of the first identification information), for example, the value of the transmission type information in the SL-Tx Resource Req [1] corresponding to the sl-DestinationIdentity 1 indicates the SL discovery, and the value of the transmission type information in the SL-TxResource Req [2] of the sl-Destination Identity 2 indicates SL communication;

(2) Through 1-bit indication information (corresponding to the second identification information or the third identification information) appearing optionally, whether the indicated SL transmission type appears may be determined according to the bit (i.e., the indication information), for example, appearance of the transmission type information (i.e., the above indication information) in SL-Tx Resource Req [1] corresponding to the sl-Destination Identity 1 indicates that the transmission type is SL discovery, no appearance of the transmission type information (i.e., the above indication information) in SL-Tx Resource Req [2] corresponding to the sl-Destination Identity 2 indicates that the transmission type is SL communication.

In this embodiment of the present application, the SL-Tx Resource Req may include the sl-Destination Identity-r16, and the indication information may be understood as adding an SL transmission type to the SL-Tx resource Req.

Step 62: UE 1 reports an SL Buffer Status Report (BSR) of SL discovery (the SL transmission type is the SL discovery), where a Destination Index (1) in the SL BSR corresponds to the sl-Destination Identity 1, and the SL transmission type is indicated as SL discovery in the message of step 61.

It is clearly stated that, the Destination Index is a sequence number of the SL-Tx Resource Req, and each SL-Tx Resource Req includes one sl-Destination Identity-R16, so that each sl-Destination Identity-r16 corresponds to one unique Destination Index; here, it may be understood that the Destination Index corresponding to the Destination Identity in the Sidelink UE Information NR identify the same destination identity.

In this example, it may be understood that UE 1 indicates, to the base station 1, a sidelink destination index corresponding to the sidelink destination identity and (identification information of) an SL transmission type corresponding to the sidelink destination index; and subsequently, UE 1 sends the sidelink destination index to the base station 1, and the base station may determine the corresponding SL transmission type accordingly.

Step 63: The base station 1 receives the SL BSR of the UE 1, and determines, according to the Destination Index, that the UE 1 requests resources of the SL discovery, and schedules the resources of the SL discovery to the UE 1 by using a physical downlink control channel (PDCCH).

Step 64: UE 1 sends a discovery message by using the resources of the SL discovery scheduled by the base station 1.

Step 65: UE1 reports the SL BSR of SL communication (the SL transmission type is the SL communication), wherein the Destination Index (2) in the SL BSR corresponds to the sl-Destination Identity 2, and the SL transmission type thereof is indicated as SL communication in the message in step 61.

Step 66: The base station 1 receives the SL BSR of the UE 1, and determines, based on the Destination Index, that the UE 1 requests resources of the SL communication, and schedules the resources of the SL communication to the UE1 by using a PDCCH.

Step 67: UE 1 performs SL communication by using the resources of SL communication scheduled by the base station 1.

It is described herein that the SL-TxResourceReq in SUI sent in step 61 may be a list, including a plurality of SL-TxResourceReq, each SL-TxResourceReq includes one SL-destination Identity-r16, so that one SUI can include correspondence between multiple sl-Destination Identity-r16s and multiple SL transmission types.

Second example: assuming that the UE 1 is a UE connected to a network, the serving base station of the UE1 is the base station 1, and the UE1 uses the UE Assistance Information (i.e. UAI) message to indicate to the base station the correspondence (corresponding to the above relationship) between the sidelink communication service type information and the sidelink communication transmission type (that is, the SL transmission type).

Figure 7:
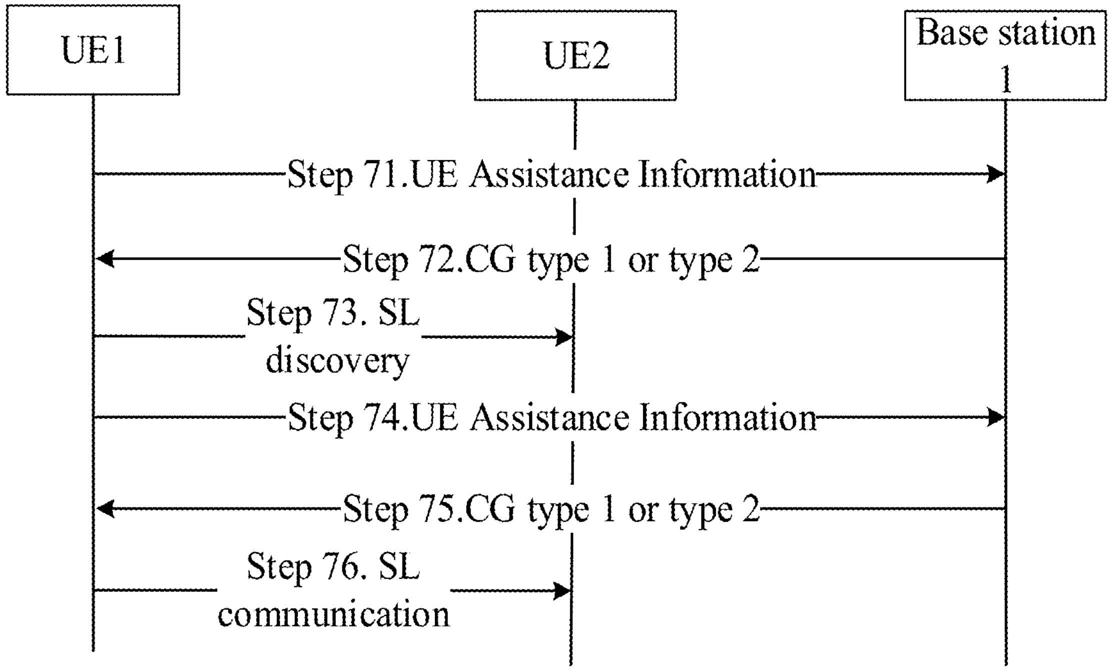
FIG. 7 is a second schematic flowchart of an information processing method according to some embodiments of the present application.

Specifically, as shown in FIG. 7, the UE indicates the SL transmission type by using the UE Assistance Information message, including the following steps:

Step 71: UE 1 sends a UE Assistance Information message to the base station 1, where the UE Assistance Information message includes correspondence between the sidelink communication service type information and the SL transmission type, and indicates that the sidelink communication transmission type is SL discovery:

SL-Traffic Pattern Info (transmission type information) in the UE Assistance Information may be a list, and each SL-Traffic Pattern Info includes an indication about whether the SL-Traffic Pattern Info is SL discovery or SL communication. Specifically, for each SL-Traffic Pattern Info, the UE Assistance Information includes one of the following newly added indication information:

(1) 1-bit transmission type information (that is, 1-bit identification information), and indicates an SL transmission type according to the value of the bit (corresponding to a value of the first identification information), for example, a value of the transmission type information is SL discovery;

(2) By 1-bit indication information (corresponding to the second identification information or the third identification information) appearing optionally, whether the indicated SL transmission type appears is determined according to the bit (i.e., the indication information), for example, appearance of the transmission type information (that is, the indication information) indicates that the transmission type is SL discovery.

Step 72: The base station 1 receives the UE Assistance Information of the UE 1, determines that the UE1 requests the resources of the SL discovery according to the sidelink communication transmission type indication (i.e. indication information) included in the SL-Traffic Pattern Info in the UE Assistance Information, and may configure a configured grant (configured grant type 1 or type 2, PDCCH needs to be activated for CG type 2) of the SL discovery for the UE1 through a dedicated signaling. That is, the base station 1 schedules the resources of the SL discovery, that is, periodic resources are configured.

The sidelink communication transmission type indication may be 1-bit indication information added in the SL-Traffic Pattern Info.

Here, the UAI can be used to request transmission resources, so that a report such as a BSR does not need to be sent subsequently.

Step 73: The UE 1 sends the discovery message by using the resources of the SL discovery allocated by the base station 1.

Step 74: The UE 1 sends a UE Assistance Information message to the base station 1, where the UE Assistance Information message includes correspondence between the sidelink communication service type information and the SL transmission type, and indicates that the SL transmission type is SL communication.

SL-Traffic Pattern Info (transmission type information) in the UE Assistance Information may a list, and the SL-Traffic Pattern Info in each SL-Traffic Pattern Info is an indication of SL discovery or SL communication. Specifically, for each SL-Traffic Pattern Info, the UE Assistance Information includes one of the following indication information:

(1) 1-bit transmission type information (that is, 1-bit identification information), an SL transmission type is indicated according to the value of the bit (corresponding to a value of the first identification information), for example, a value of the transmission type information is SL communication;

(2) By 1-bit indication information (corresponding to the second identification information or the third identification information) appearing optionally, whether the indicated SL transmission type appears is indicated according to the bit (i.e., the indication information), for example, appearance of the transmission type information (that is, the indication information) indicates that the transmission type is SL communication.

Step 75: The base station 1 receives the UE Assistance Information of the UE1, determines that the UE1 requests the resources of the SL communication according to the sidelink communication transmission type indication (i.e. indication information) included in the SL-Traffic Pattern Info in the UE Assistance Information, and may configure a configured grant (configured grant type 1 or type 2, PDCCH needs to be activated for CG type 2) of the SL communication for the UE1 through a dedicated signaling. That is, the base station 1 schedules the resources of the SL communication, that is, periodic resources are configured.

Step 76: The UE 1 sends the communication message by using the SL communication resource allocated by the base station 1.

Third example: it is assumed that the UE1 is a UE connected to a network, the serving base station of the UE1 is the base station 1, and the UE1 uses a new RRC message (corresponding to the other RRC messages) to indicate to the base station 1 the correspondence (corresponding to the above relationship) between the sidelink communication target identifier (i.e. the sidelink destination identity) and the sidelink communication transmission type (i.e. the SL transmission type).

Figure 8:
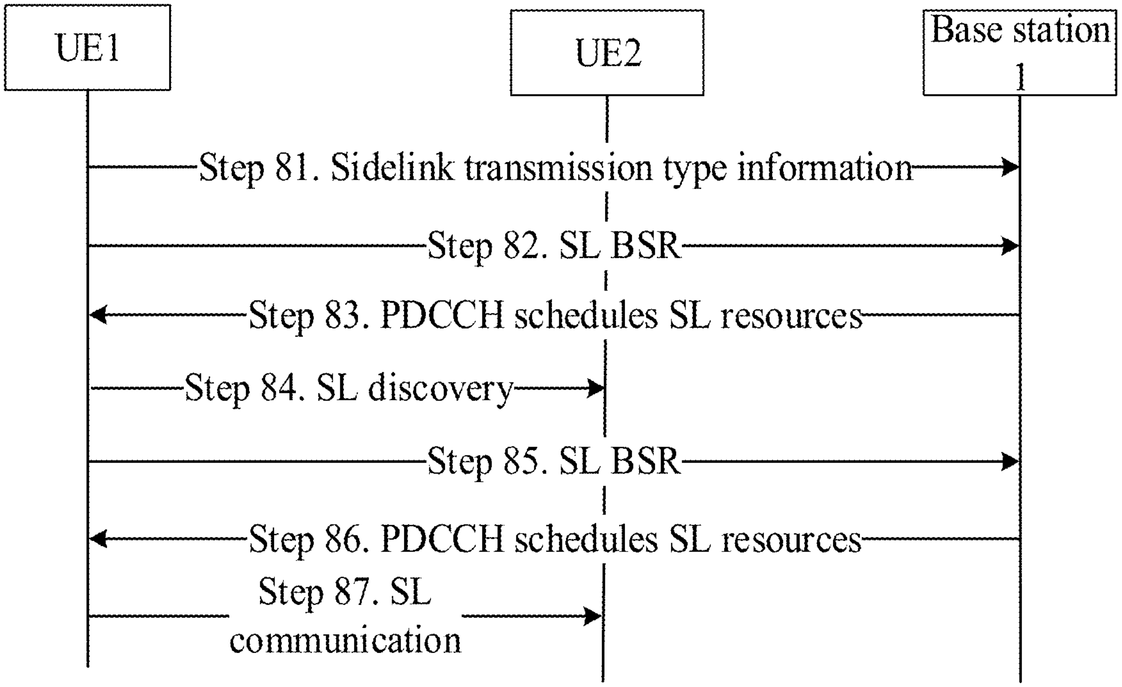
FIG. 8 is a third schematic flowchart of an information processing method according to some embodiments of the present application.

Specifically, as shown in FIG. 8, the UE indicates the SL transmission type by using a new RRC message, the following steps are involved:

Step 81: The UE 1 sends a new RRC message to the base station 1, where the new RRC message includes correspondence between the sidelink destination identity and the SL transmission type, and specifically, the SL transmission type is indicated for each sidelink destination identity in one of the following manners:

(1) 1-bit identification information is included, an SL transmission type is indicated according to the value of the bit (corresponding to a value of the first identification information), for example, a value of 0 indicates SL communication, a value of 1 indicates SL discovery;

(2) By 1-bit indication information (corresponding to the second identification information or the third identification information) appearing optionally, whether the identified SL transmission type appears is indicated according to the bit (i.e., the indication information), for example, no appearance of the indication information indicates that the transmission type is SL communication, appearance of the indication information indicates that the transmission type is SL discovery.

Specifically, the new RRC message includes a destination index corresponding to the sidelink destination identity, and indicates an SL transmission type corresponding to the destination index.

The new RRC message in step 81 indicates the SL transmission types corresponding to the plurality of destination IDs.

Step 82: UE1 reports SL BSR of the SL discovery (the SL transmission type is the SL discovery), where the sidelink destination identity corresponding to the Destination Index indicates the SL discovery in the message of step 81.

Step 83: The base station 1 receives the SL BSR of the UE1, determines, based on the Destination Index, that the UE 1 requests the resources of the SL discovery, and uses the PDCCH to schedule the resources of SL discovery to the UE1.

Step 84: UE 1 sends the discovery message by using the resources of SL discovery scheduled by the base station 1.

Step 85: UE 1 reports the SL BSR of SL communication (the SL transmission type is SL communication), where the sidelink destination identity corresponding to the Destination Index indicates SL communication in the message in step 81.

Step 86: The base station 1 receives the SL BSR of the UE1, determines, based on the Destination Index, that the UE1 requests the resources of SL communication, and uses the PDCCH to schedule the resources of SL communication to the UE1.

Step 87: UE 1 performs SL communication by using the resources of SL communication scheduled by the base station 1.

It can be learned from the foregoing that the foregoing first example is dynamic scheduling, and indicates an SL transmission type corresponding to the sidelink destination identity by indicating an SL transmission type corresponding to an index (which has correspondence with a destination identity) in a request list; a dynamic resource request is subsequently performed by using the SL-BSR; the second example is semi-persistent scheduling, and the UAI may directly request a resource (a periodic resource); the third example is similar to the first example, but the message may be another RRC message.

In conclusion, in this embodiment of the present application, the base station needs to schedule resources of different resource pools for SL discovery and SL communication, to provide a method for the terminal to indicate the relationship between sidelink destination identity or service type information, which solves the problem that the base station cannot determine the scheduled resource type required by the terminal device, that is, solves the problem that how the base station distinguishes the transmission resources of the SL discovery and the SL communication after the SL discovery is introduced.

Figure 9:
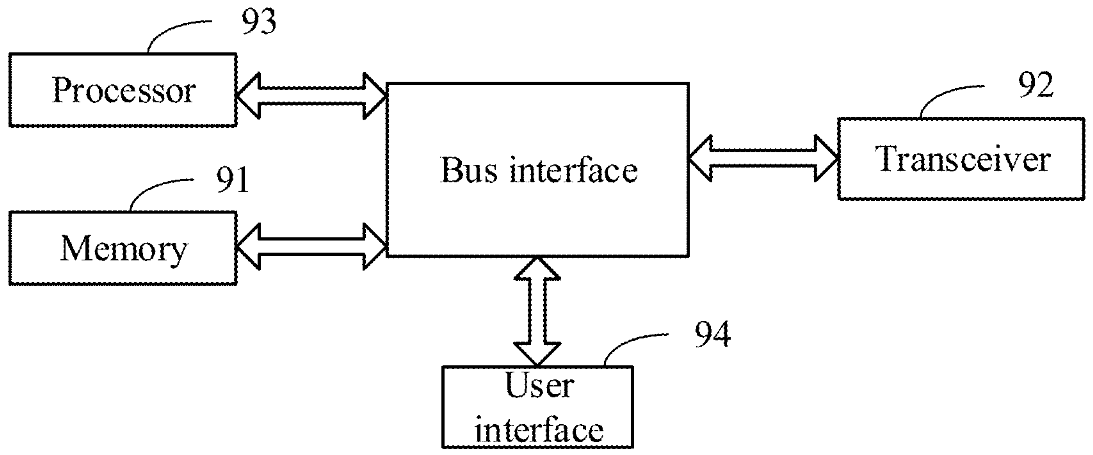
FIG. 9 is a schematic structural diagram of a terminal device according to some embodiments of the present application.

An embodiment of the present application further provides a terminal device, as shown in FIG. 9, the terminal device includes a memory 91, a transceiver 92, and a processor 93.

The memory 91 is used to store a computer program; the transceiver 92 is used to send and receive data under the control of the processor 93; and the processor 93 is used to read the computer program in the memory 91 and perform the following operations:

sending indication information to a network device by using the transceiver 92; where the indication information is used to indicate relationship between a sidelink destination identity and a sidelink SL transmission type, or relationship between service type information and an SL transmission type; and the SL transmission type is SL discovery or SL communication.

The terminal device provided in this embodiment of the present application sends indication information to a network device; wherein the indication information is used to indicate relationship between the sidelink destination identity and the sidelink SL transmission type, or relationship between the service type information and the SL transmission type; the SL transmission type is SL discovery or SL communication; and the terminal device can indicate the relationship between the sidelink destination identity or the service type information and the SL transmission type to the network device, so that the network device can subsequently clearly determine whether the scheduling needed by the terminal device is the SL discovery resource or the SL communication resource, thereby well solving the problem in the related art that the network device cannot determine the scheduled resource type required by the terminal device.

Specifically, the transceiver 92 is used to receive and send data under the control of the processor 93.

In FIG. 9, the bus architecture may include any number of interconnected buses and bridges, and specifically link various circuits of one or more processors represented by the processor 93 and the memory represented by the memory 91. The bus architecture may further link various other circuits, such as a peripheral device, a voltage stabilizer, and a power management circuit, which are well known in the art, and therefore are not further described herein. The bus interface provides an interface. The transceiver 92 may be a plurality of elements, that is, includes a transmitter and a receiver, and provides units for communicating with various other apparatuses on a transmission medium, where the transmission mediums include transmission media such as a wireless channel, a wired channel, and an optical cable. For different user equipment, the user interface 94 may also be an interface capable of externally or internally connecting to a required device, and the connected device includes, but is not limited to, a keypad, a display, a speaker, a microphone, a joystick, and the like.

The processor 93 is responsible for managing the bus architecture and general processing, and the memory 91 may store data used by the processor 93 when performing operations.

Optionally, the processor 93 may be a central processing unit (CPU), an application specific integrated circuit (ASIC), a field programmable gate array (FPGA), or a complex programmable logic device (CPLD), and the processor may also use a multi-core architecture.

The processor invokes the computer program stored in the memory, and is used to perform any one of the methods provided in the embodiments of the present application according to the obtained executable instructions. The processor and the memory may also be physically arranged separately.

In this embodiment of the present application, one sidelink destination identity in the relationship corresponds to one SL transmission type; and/or one service type information in the relationship corresponds to one SL transmission type.

If the indication information includes the first identification information of the SL transmission type; in a case that the first identification information takes a first value, the first identification information indicates that the SL transmission type is SL discovery; in a case that the first identification information takes a second value, the first identification information indicates that the SL transmission type is SL communication; or, if the indication information includes second identification information of the SL transmission type, then in a case that the second identification information appears, it indicates that the SL transmission type is SL discovery; in a case that the second identification information does not appear, it indicates that the SL transmission type is SL communication; or, if the indication information includes third identification information of an SL transmission type, then in a case that the third identification information appears, it indicates that the SL transmission type is SL communication; in a case that the third identification information does not appear, it indicates that the SL transmission type is SL discovery.

Optionally, if the indication information includes the second identification information of the SL transmission type, then in a case that the second identification information appears, the second identification information includes a sidelink destination identity, and the sidelink destination identity corresponds to a sidelink destination index.

Optionally, in a case that the terminal device reports the SL-BSR, if the sidelink destination identity corresponding to the sidelink destination index carried in the SL-BSR is a sidelink destination identity included in the second identification information, the resource requested by the SL-BSR is an SL discovery resource.

In this embodiment of the present application, sending the indication information to the network device includes: sending the indication information to the network device by using first radio resource control (RRC) information, where the first RRC information is sidelink UE information (Sidelink UE Information NR, SUI), or UE assistance information (UAI), or other RRC information other than SUI and UAI.

In a case that the first RRC information is SUI, the indication information is included in a sidelink communication resource request corresponding to a sidelink destination identity, and the indication information includes a sidelink destination index corresponding to a sidelink destination identity and identification information of an SL transmission type corresponding to the sidelink destination index, where the identification information is the first identification information or the second identification information or the third identification information.

In this embodiment of the present application, after sending the indication information to the network device, the operation further includes: sending an SL buffer status report to the network device by means of the transceiver, where the SL buffer status report carries a sidelink destination index corresponding to the sidelink destination identity.

In a case that the first RRC information is UAI, the UAI is further used to request a transmission resource.

It should be noted that, the above-mentioned device provided in the embodiments of the present application can implement all method steps implemented by the above-mentioned method embodiments of the terminal device side, and can achieve the same technical effect, the same parts and beneficial effects as the method embodiments will not be repeated in this embodiment.

Figure 10:
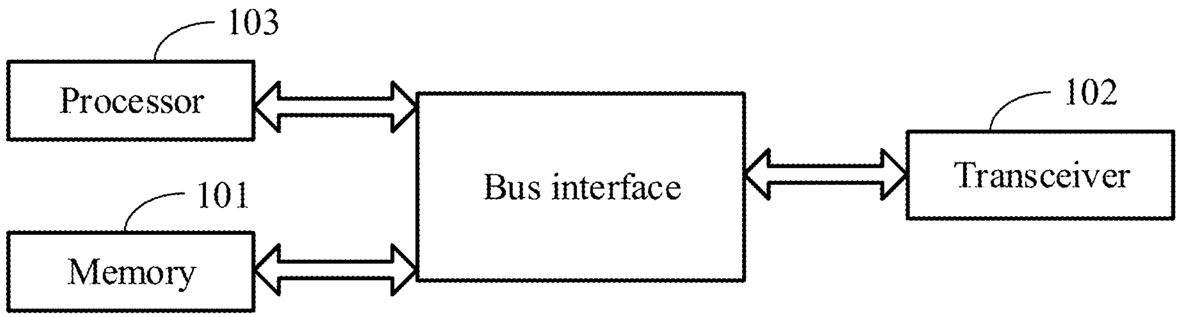
FIG. 10 is a schematic structural diagram of a network device according to some embodiments of the present application.

An embodiment of the present application further provides a network device, as shown in FIG. 10, the network device includes a memory 101, a transceiver 102, and a processor 103:

The memory 101 is used to store a computer program; the transceiver 102 is used to send and receive data under the control of the processor 103; and the processor 103 is used to read the computer program in the memory 101 and perform the following operations:

receiving, by using the transceiver 102, indication information sent by a terminal device; and determining a target transmission resource type according to the indication information; where the indication information is used to indicate relationship between a sidelink destination identity and a sidelink SL transmission type, or relationship between service type information and an SL transmission type; the SL transmission type is SL discovery or SL communication; and the target transmission resource type is an SL transmission resource type corresponding to the sidelink destination identity, or an SL transmission resource type corresponding to the service type information.

The network device provided in this embodiment of the present application receives the indication information sent by the terminal device, and determines a target transmission resource type according to the indication information; wherein the indication information is used to indicate relationship between the sidelink destination identity and the sidelink SL transmission type, or relationship between the service type information and the SL transmission type; the SL transmission type is SL discovery or SL communication; the target transmission resource type is an SL transmission resource type corresponding to the sidelink destination identity, or an SL transmission resource type corresponding to the service type information; and relationship between the sidelink destination identity or the service type information and the SL transmission type can be indicated by the terminal device to the network device. In this way, the network device may subsequently clearly determine whether scheduling needed by the terminal device is the SL discovery resource or the SL communication resource, thereby well solving the problem in the related art that the network device cannot determine the scheduled resource type required by the terminal device.

Specifically, the transceiver 102 is used to receive and send data under the control of the processor 103.

In FIG. 10, the bus architecture may include any number of interconnected buses and bridges, and specifically link various circuits of one or more processors represented by the processor 103 and a memory represented by the memory 101. The bus architecture may further link various other circuits, such as a peripheral device, a voltage stabilizer, and a power management circuit, which are well known in the art, and therefore are not further described herein. The bus interface provides an interface. The transceiver 102 may be a plurality of elements, that is, includes a transmitter and a receiver, and provides units for communicating with various other apparatuses on a transmission medium, where the transmission mediums include transmission media such as a wireless channel, a wired channel, and an optical cable. The processor 103 is responsible for managing the bus architecture and general processing, and the memory 101 may store data used by the processor 103 when performing operations.

The processor 103 may be a central embedded device (CPU), an application specific integrated circuit (ASIC), a field programmable gate array (FPGA), or a complex programmable logic device (CPLD), and the processor may also use a multi-core architecture.

In this embodiment of the present application, one sidelink destination identity in the relationship corresponds to one SL transmission type; and/or one service type information in the relationship corresponds to one SL transmission type.

If the indication information includes the first identification information of the SL transmission type, then in a case that the first identification information takes a first value, it indicates that the SL transmission type is SL discovery; in a case that the first identification information takes a second value, it indicates that the SL transmission type is SL communication; or, if the indication information includes second identification information of the SL transmission type, then in a case that the second identification information appears, it indicates that the SL transmission type is SL discovery; in a case that the second identification information does not appear, it indicates that the SL transmission type is SL communication; or, if the indication information includes third identification information of an SL transmission type, it indicates that the SL transmission type is SL communication in a case that the third identification information appears; in a case that the third identification information does not appear, it indicates that the SL transmission type is SL discovery.

Optionally, if the indication information includes the second identification information of the SL transmission type, then in a case that the second identification information appears, the second identification information includes a sidelink destination identity, and the sidelink destination identity corresponds to the sidelink destination index.

Optionally, in a case that the SL-BSR reported by the terminal device is received, if the sidelink destination identity corresponding to the sidelink destination index carried in the SL-BSR is a sidelink destination identity included in the second identification information, then it is determined that the resource requested by the SL-BSR is an SL discovery resource.

In this embodiment of the present application, the receiving indication information sent by the terminal device includes: receiving indication information sent by the terminal device by using the first radio resource control RRC information, where the first RRC information is sidelink UE information SUI, or terminal assistance information UAI, or other RRC information other than SUI and UAI.

In a case that the first RRC information is SUI, the indication information is included in a sidelink communication resource request corresponding to a sidelink destination identity, and the indication information includes a sidelink destination index corresponding to a sidelink destination identity and identification information of an SL transmission type corresponding to the sidelink destination index, where the identification information is the first identification information or the second identification information or the third identification information.

In this embodiment of the present application, the operation further includes: receiving, by using the transceiver, an SL buffer status report sent by a terminal device, where the determining a target transmission resource type based on the indication information includes: determining a target transmission resource type according to the indication information and an SL buffer status report, where the SL buffer status report carries a sidelink destination index corresponding to a sidelink destination identity.

In a case that the first RRC information is UAI, the UAI is further used to request a transmission resource.

It should be noted that the foregoing apparatus provided in the embodiments of the present application can implement all method steps implemented by the foregoing method embodiments of the network device side, and can achieve the same technical effect, and details and beneficial effects that are the same as those of the method embodiments in this embodiment are not described herein again.

Figure 11:
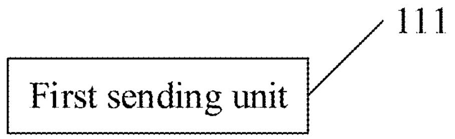
FIG. 11 is a first schematic structural diagram of an information processing apparatus according to some embodiments of the present application.

An embodiment of the present application further provides an information processing apparatus, applied to a terminal device, as shown in FIG. 11, the apparatus includes: a first sending unit 111, used to send indication information to a network device; where the indication information is used to indicate relationship between a sidelink destination identity and a sidelink SL transmission type, or relationship between service type information and an SL transmission type; and the SL transmission type is SL discovery or SL communication.

The information processing apparatus provided in this embodiment of the present application sends indication information to a network device; wherein the indication information is used to indicate relationship between the sidelink destination identity and the sidelink SL transmission type, or relationship between the service type information and the SL transmission type; the SL transmission type is SL discovery or SL communication; and the apparatus can indicate the relationship between the sidelink destination identity or the service type information and the SL transmission type to the network device, so that the network device can subsequently clearly determine whether the scheduling needed by the terminal device is the SL discovery resource or the SL communication resource, thereby well solving the problem in the related art that the network device cannot determine the scheduled resource type required by the terminal device.

In this embodiment of the present application, one sidelink destination identity in the relationship corresponds to one SL transmission type; and/or one service type information in the relationship corresponds to one SL transmission type.

If the indication information includes the first identification information of the SL transmission type; in a case that the first identification information takes a first value, the first identification information indicates that the SL transmission type is SL discovery; in a case that the first identification information takes a second value, the first identification information indicates that the SL transmission type is SL communication; or, if the indication information includes second identification information of the SL transmission type, then in a case that the second identification information appears, it indicates that the SL transmission type is SL discovery; in a case that the second identification information does not appear, it indicates that the SL transmission type is SL communication; or, if the indication information includes third identification information of an SL transmission type, then in a case that the third identification information appears, it indicates that the SL transmission type is SL communication; in a case that the third identification information does not appear, it indicates that the SL transmission type is SL discovery.

Optionally, if the indication information includes the second identification information of the SL transmission type, then in a case that the second identification information appears, the second identification information includes a sidelink destination identity, and the sidelink destination identity corresponds to a sidelink destination index.

Optionally, in a case that the terminal device reports the SL-BSR, if the sidelink destination identity corresponding to the sidelink destination index carried in the SL-BSR is a sidelink destination identity included in the second identification information, the resource requested by the SL-BSR is an SL discovery resource.

In this embodiment of the present application, sending the indication information to the network device includes: sending the indication information to the network device by using first radio resource control (RRC) information, where the first RRC information is sidelink UE information (Sidelink UE Information NR, SUI), or UE assistance information (UAI), or other RRC information other than SUI and UAI.

In a case that the first RRC information is SUI, the indication information is included in a sidelink communication resource request corresponding to a sidelink destination identity, and the indication information includes a sidelink destination index corresponding to a sidelink destination identity and identification information of an SL transmission type corresponding to the sidelink destination index, where the identification information is the first identification information or the second identification information or the third identification information.

In this embodiment of the present application, the information processing apparatus further includes: a second sending unit, used to send an SL buffer status report to the network device after sending the indication information to the network device, where the SL buffer status report carries a sidelink destination index corresponding to the sidelink destination identity.

In a case that the first RRC information is UAI, the UAI is further used to request a transmission resource.

It should be noted that, the above-mentioned device provided in the embodiments of the present application can implement all method steps implemented by the above-mentioned method embodiments of the terminal device side, and can achieve the same technical effect, the same parts and beneficial effects as the method embodiments will not be repeated in this embodiment.

Figure 12:
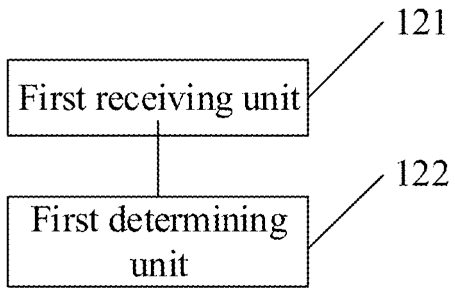
FIG. 12 is a second schematic structural diagram of an information processing apparatus according to some embodiments of the present application.

An embodiment of the present application further provides an information processing apparatus, applied to a network device, as shown in FIG. 12, the apparatus includes:

- a first receiving unit 121, used to receive indication information sent by a terminal device; and
- a first determining unit 122, used to determine a target transmission resource type according to the indication information; where the indication information is used to indicate relationship between a sidelink destination identity and a sidelink SL transmission type, or relationship between service type information and an SL transmission type; the SL transmission type is SL discovery or SL communication; and the target transmission resource type is an SL transmission resource type corresponding to the sidelink destination identity, or an SL transmission resource type corresponding to the service type information.

The information processing apparatus provided in this embodiment of the present application receives the indication information sent by the terminal device, and determines a target transmission resource type according to the indication information; wherein the indication information is used to indicate relationship between the sidelink destination identity and the sidelink SL transmission type, or relationship between the service type information and the SL transmission type; the SL transmission type is SL discovery or SL communication; the target transmission resource type is an SL transmission resource type corresponding to the sidelink destination identity, or an SL transmission resource type corresponding to the service type information; and relationship between the sidelink destination identity or the service type information and the SL transmission type can be indicated by the terminal device to the network device. In this way, the network device may subsequently clearly determine whether scheduling needed by the terminal device is the SL discovery resource or the SL communication resource, thereby well solving the problem in the related art that the network device cannot determine the scheduled resource type required by the terminal device.

In this embodiment of the present application, one sidelink destination identity in the relationship corresponds to one SL transmission type; and/or one service type information in the relationship corresponds to one SL transmission type.

If the indication information includes the first identification information of the SL transmission type, then in a case that the first identification information takes a first value, it indicates that the SL transmission type is SL discovery; in a case that the first identification information takes a second value, it indicates that the SL transmission type is SL communication; or, if the indication information includes second identification information of the SL transmission type, then in a case that the second identification information appears, it indicates that the SL transmission type is SL discovery; in a case that the second identification information does not appear, it indicates that the SL transmission type is SL communication; or, if the indication information includes third identification information of an SL transmission type, it indicates that the SL transmission type is SL communication in a case that the third identification information appears; in a case that the third identification information does not appear, it indicates that the SL transmission type is SL discovery.

Optionally, if the indication information includes the second identification information of the SL transmission type, then in a case that the second identification information appears, the second identification information includes a sidelink destination identity, and the sidelink destination identity corresponds to the sidelink destination index.

Optionally, in a case that the SL-BSR reported by the terminal device is received, if the sidelink destination identity corresponding to the sidelink destination index carried in the SL-BSR is a sidelink destination identity included in the second identification information, then it is determined that the resource requested by the SL-BSR is an SL discovery resource.

In this embodiment of the present application, the receiving indication information sent by the terminal device includes: receiving indication information sent by the terminal device by using the first radio resource control RRC information, where the first RRC information is sidelink UE information SUI, or terminal assistance information UAI, or other RRC information other than SUI and UAI.

In a case that the first RRC information is SUI, the indication information is included in a sidelink communication resource request corresponding to a sidelink destination identity, and the indication information includes a sidelink destination index corresponding to a sidelink destination identity and identification information of an SL transmission type corresponding to the sidelink destination index, where the identification information is the first identification information or the second identification information or the third identification information.

In this embodiment of the present application, the information processing apparatus further includes a second receiving unit, used to receiving an SL buffer status report sent by a terminal device, where determining a target transmission resource type based on the indication information includes: determining a target transmission resource type according to the indication information and an SL buffer status report, where the SL buffer status report carries a sidelink destination index corresponding to a sidelink destination identity.

In a case that the first RRC information is UAI, the UAI is further used to request a transmission resource.

It should be noted that the foregoing apparatus provided in the embodiments of the present application can implement all method steps implemented by the foregoing method embodiments of the network device side, and can achieve the same technical effect, and details and beneficial effects that are the same as those of the method embodiments in this embodiment are not described herein again.

It should be noted that the division of the units in the embodiments of the present application is schematic, and is merely logical function division, and there may be another division manner in actual implementation. In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a processor-readable storage medium. Based on such understanding, an essential part, or a part contributing to the related art, or some, or all, of the technical solutions of the present application may be embodied in the form of a software product, and the computer software product is stored in a storage medium and includes several instructions for causing a computer device (which may be a personal computer, a server, or a network device, etc.) or a processor to perform all or part of the steps of the method described in the embodiments of the present application. The foregoing storage medium includes: any medium that can store program codes, such as a USB flash drive, a removable hard disk, a read-only memory (Read-Only Memory, ROM), a random access memory (RAM), a magnetic disk, or an optical disk.

An embodiment of the present application further provides a processor-readable storage medium, where the processor-readable storage medium stores a computer program, and the computer program is used to cause the processor to execute the information processing method on the terminal device side; or the computer program is used to cause the processor to perform the information processing method on the network device side.

The processor-readable storage medium may be any usable medium or data storage device accessible by the processor, including but not limited to a magnetic memory (for example, a floppy disk, a hard disk, a magnetic tape, a magneto-optical disk (MO), etc.), an optical memory (for example, a CD, a DVD, a BD, an HVD, etc.), and a semiconductor memory (for example, a ROM, an EPROM, an EEPROM, a non-volatile memory (NAND Flash), a solid-state hard disk (SSD)), or the like.

The implementation embodiments of the information processing method on the terminal device side or the network device side are all applicable to the embodiment of the processor-readable storage medium, and can also achieve the same technical effect.

A person skilled in the art should understand that the embodiments of the present application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a magnetic disk memory and an optical memory) that include computer-usable program codes.

This application is described with reference to the flowcharts and/or block diagrams of the method, the device (system), and the computer program product according to the embodiments of the present application. It should be understood that each process and/or block in the flowcharts and/or block diagrams and a combination of flows and/or blocks in the flowcharts and/or block diagrams may be implemented by computer-executable instructions. These computer-executable instructions may be provided to a processor of a general-purpose computer, a special-purpose computer, an embedded processor, or another programmable data processing device to produce a machine, such that the instructions executed by the processor of the computer or other programmable data processing device generate means for implementing the functions specified in one or more flows of the flowcharts and/or one or more blocks of the block diagrams.

These processor-executable instructions may also be stored in a processor-readable memory that can direct a computer or other programmable data processing device to function in a particular manner, such that the instructions stored in the processor-readable memory produce an article of manufacture including an instruction device that implements the functions specified in one or more flows of the flowcharts and/or one or more blocks of the block diagrams.

These processor-executable instructions may also be loaded onto a computer or other programmable data processing device such that a series of operational steps are performed on the computer or other programmable device to produce a computer-implemented process, such that the instructions executed on the computer or other programmable device provide steps for implementing the functions specified in one or more flows of the flowcharts and/or one or more blocks of the block diagrams.

It should be noted that, it should be understood that the division of each of the foregoing modules is merely a division of logical functions, and during actual implementation, all or some of the foregoing modules may be integrated into one physical entity, or may be physically separated. The modules may all be implemented in a form of software invoked by a processing element, or may all be implemented in a form of hardware; or some modules may be implemented in a form of invoking software by using a processing element, and some modules are implemented in a form of hardware. For example, the determining module may be a separately established processing element, or may be integrated in a certain chip of the foregoing apparatus, and in addition, the determining module may be stored in a memory of the foregoing apparatus in a form of program codes, and a certain processing element of the foregoing apparatus invokes and executes the function of the foregoing determining module. Other modules may be implemented similarly. In addition, all or some of these modules may be integrated together, or may be implemented independently. The processing element described herein may be an integrated circuit with signal processing capability. In an implementation process, each step of the foregoing method or the foregoing modules may be completed by using an integrated logic circuit of hardware in the processor element or an instruction in a form of software.

For example, each module, unit, subunit, or submodule may be one or more integrated circuits used to implement the foregoing method, for example, one or more application specific integrated circuits (ASIC), or one or more microprocessors (DSP), or one or more field programmable gate arrays (FPGA). For another example, when a certain module is implemented in a form of scheduling program codes by using a processing element, the processing element may be a general-purpose processor, for example, a central processing unit (CPU) or another processor that can invoke the program codes. For another example, these modules may be integrated together and implemented in a form of a system-on-a-chip (SOC).

The terms "first", "second", and the like in the specification and claims of the present application are used to distinguish similar objects, and are not necessarily used to describe a specific order or sequence. It should be understood that the term used in this way may be interchanged under appropriate circumstances, so that the embodiments of the present application described herein are implemented in an order other than those illustrated or described herein. In addition, the terms "include" and "have" and any variations thereof are intended to cover non-exclusive inclusion, for example, processes, methods, systems, products, or devices that include a series of steps or units are not necessarily limited to those steps or units that are clearly listed, but may include other steps or units that are not expressly listed or inherent to these processes, methods, products, or devices. In addition, the description and claims use "and/or" to refer to at least one of the connected objects, such as A and/or B and/or C, indicating that A exists only, B exists only, C exists only, bot A and B exist, both B and C exist, both A and C exist, and all A, B and C exist. Similarly, the use of "at least one of A and B" in this specification and the claims should be understood as "A alone, B alone, or both A and B".

Obviously, a person skilled in the art can make various modifications and variations to this application without departing from the spirit and scope of the present application. This application is intended to cover these modifications and variations provided that they fall within the scope of protection defined by the following claims and their equivalent technologies.

What is claimed is:

1. An information processing method applied to a terminal device, the method comprising:

sending indication information to a network device, wherein the indication information is used to indicate relationship between a sidelink destination identity and a sidelink SL transmission type, or relationship between service type information and an SL transmission type, and the SL transmission type is SL discovery or SL communication, the indication information comprises second identification information of the SL transmission type;

in a case that the second identification information appears, the indication information indicates that the SL transmission type is the SL discovery; the second identification information comprises a sidelink destination identity, and the sidelink destination identity corresponds to a sidelink destination index;

in a case that the second identification information does not appear, the indication information indicates that the SL transmission type is the SL communication.

2. The information processing method according to claim 1, wherein one sidelink destination identity in the relationship corresponds to one SL transmission type; and/or one service type information in the relationship corresponds to one SL transmission type.

3. The information processing method according to claim 1, wherein in a case that the terminal device reports a sidelink buffer status report (SL-BSR), if the sidelink destination identity corresponding to the sidelink destination index carried in the SL-BSR is the sidelink destination identity comprised in the second identification information, a resource requested by the SL-BSR is an SL discovery resource.

4. The information processing method according to claim 1, wherein sending the indication information to the network device comprises:

sending the indication information to the network device by using the first radio resource control RRC information, wherein the first RRC information is sidelink user equipment information SUI, or user equipment assistance information UAI, or other RRC information other than the SUI and the UAI.

5. The information processing method according to claim 4, wherein in a case that the first RRC information is the SUI, the indication information is comprised in a sidelink communication resource request corresponding to the sidelink destination identity, the indication information comprises a sidelink destination index corresponding to the sidelink destination identity and identification information of the SL transmission type corresponding to the sidelink destination index, wherein the identification information is the first identification information, or the second identification information or the third identification information.

6. The information processing method according to claim 5, wherein after sending the indication information to the network device, the method further comprises:

sending an SL buffer status report to the network device, wherein the SL buffer status report carries a sidelink destination index corresponding to the sidelink destination identity.

7. The information processing method according to claim 4, wherein in a case that the first RRC information is the UAI, the UAI is further used to request a transmission resource.

8. An information processing method applied to a network device, the method comprising:

receiving indication information sent by a terminal device;

determining a target transmission resource type according to the indication information; wherein the indication information is used to indicate relationship between a sidelink destination identity and a sidelink SL transmission type, or relationship between service type information and an SL transmission type; the SL transmission type is SL discovery or SL communication; and the target transmission resource type is an SL transmission resource type corresponding to the sidelink destination identity, or an SL transmission resource type corresponding to the service type information, the indication information comprises second identification information of the SL transmission type;

in a case that the second identification information appears, the indication information indicates that the SL transmission type is the SL discovery; the second identification information comprises a sidelink destination identity, and the sidelink destination identity corresponds to a sidelink destination index;

in a case that the second identification information does not appear, the indication information indicates that the SL transmission type is the SL communication.

9. The information processing method according to claim 8, wherein one sidelink destination identities in the relationship corresponds to one SL transmission type; and/or one service type information in the relationship corresponds to one SL transmission type.

10. The information processing method according to claim 8, wherein in a case that a sidelink buffer status report (SL-BSR) reported by the terminal device is received, if the sidelink destination identity corresponding to the sidelink destination index carried in the SL-BSR is the sidelink destination identity comprised in the second identification information, a resource requested by the SL-BSR is determined to be an SL discovery resource.

11. The information processing method according to claim 8, wherein receiving the indication information sent by the terminal device comprises:

receiving the indication information sent by the terminal device by using first radio resource control RRC information, wherein the first RRC information is sidelink user equipment information SUI, or user equipment assistance information UAI, or other RRC information other than the SUI and the UAI.

12. The information processing method according to claim 11, wherein in a case that the first RRC information is the SUI, the indication information is comprised in a sidelink communication resource request corresponding to a sidelink destination identity, and the indication information comprises a sidelink destination index corresponding to a sidelink destination identity and identification information of an SL transmission type corresponding to the sidelink destination index, wherein the identification information is the first identification information or the second identification information or the third identification information.

13. The information processing method according to claim 12, further comprising:

receiving an SL buffer status report sent by the terminal device;

wherein determining the target transmission resource type according to the indication information comprises: determining a target transmission resource type according to the indication information and the SL buffer status report, wherein the SL buffer status report carries a sidelink destination index corresponding to the sidelink destination identity.

14. The information processing method according to claim 11, wherein in a case that the first RRC information is the UAI, the UAI is further used to request a transmission resource.

15. A network device, comprising:

a memory, a transceiver, and a processor, wherein the memory is used to store a computer program; the transceiver is used to send and receive data under control of the processor; and the processor is used to read the computer program in the memory and perform the method according to claim 8.

16. A terminal device, comprising:

a memory, a transceiver, and a processor, wherein the memory is used to store a computer program; the transceiver is used to send and receive data under control of the processor; and the processor is used to read the computer program in the memory and perform following operations:

sending indication information to a network device by using the transceiver, wherein the indication information is used to indicate relationship between a sidelink destination identity and a sidelink SL transmission type, or relationship between service type information and an SL transmission type, and the SL transmission type is SL discovery or SL communication, the indication information comprises second identification information of the SL transmission type;

in a case that the second identification information appears, the indication information indicates that the SL transmission type is the SL discovery; the second identification information comprises a sidelink destination identity, and the sidelink destination identity corresponds to a sidelink destination index;

in a case that the second identification information does not appear, the indication information indicates that the SL transmission type is the SL communication.

* * * * *